United States Patent
Guvenc

(10) Patent No.: US 8,422,469 B2
(45) Date of Patent: Apr. 16, 2013

(54) METHOD FOR INTERFERENCE-MINIMIZING RESOURCE BLOCK-SIZE SELECTION AT A MACROCELL, A MICROCELL AND A FEMTOCELL

(75) Inventor: Ismail Guvenc, Santa Clara, CA (US)

(73) Assignee: NTT DoCoMo, Inc., Tokyo (JP)

( * ) Notice: Subject to any disclaimer, the term of this patent is extended or adjusted under 35 U.S.C. 154(b) by 438 days.

(21) Appl. No.: 12/501,320

(22) Filed: Jul. 10, 2009

(65) Prior Publication Data
US 2010/0056167 A1 Mar. 4, 2010

Related U.S. Application Data

(63) Continuation-in-part of application No. 12/333,138, filed on Dec. 11, 2008.

(60) Provisional application No. 61/151,121, filed on Feb. 9, 2009, provisional application No. 61/093,206, filed on Aug. 29, 2008.

(51) Int. Cl.
*H04W 72/04* (2009.01)
(52) U.S. Cl.
USPC ........... 370/338; 370/329; 370/330; 455/450; 455/67.11; 455/403
(58) Field of Classification Search .................. 370/338, 370/329, 342, 394; 455/450, 67.11, 444, 455/436, 434
See application file for complete search history.

(56) References Cited

U.S. PATENT DOCUMENTS

| | | | |
|---|---|---|---|
| 6,225,948 B1 | 5/2001 | Baier et al. | |
| 6,501,745 B1 * | 12/2002 | Turina et al. | 370/337 |
| 7,453,855 B1 * | 11/2008 | Madhow | 370/335 |
| 7,610,036 B2 * | 10/2009 | Teo et al. | 455/403 |
| 2004/0190482 A1 * | 9/2004 | Baum et al. | 370/347 |
| 2006/0245352 A1 * | 11/2006 | Kang et al. | 370/229 |
| 2006/0280116 A1 * | 12/2006 | Ji et al. | 370/210 |
| 2007/0097938 A1 | 5/2007 | Nylander et al. | |
| 2007/0211757 A1 * | 9/2007 | Oyman | 370/468 |
| 2007/0248173 A1 | 10/2007 | Hassan et al. | |
| 2007/0254620 A1 | 11/2007 | Lindquist et al. | |
| 2008/0002658 A1 | 1/2008 | Soliman | |
| 2008/0049709 A1 | 2/2008 | Pan et al. | |
| 2008/0232487 A1 * | 9/2008 | Cleveland et al. | 375/260 |

(Continued)

OTHER PUBLICATIONS

PCT International Search Report for International Application No. PCT/US2009/067172 dated Feb. 4, 2010, 3 pages.

(Continued)

*Primary Examiner* — Ricky Ngo
*Assistant Examiner* — Rasheed Gidado
(74) *Attorney, Agent, or Firm* — Haynes and Boone, LLP

(57) ABSTRACT

A method for minimizing interference is applicable to a primary network whether or not spectrum resources are assigned to its users using a block-wise subcarrier assignment scheme or a randomized allocation scheme. The identified unused spectrum resources that are to be assigned to the users of the opportunistic network exclude un-used subcarriers adjacent to subcarriers used by the users of the primary network to avoid interference. The opportunistic network may assign the identified unused spectrum resources using a scheme that selects a block size for an adaptive modulation and coding scheme or for avoidance of waste of spectrum resources.

7 Claims, 4 Drawing Sheets

U.S. PATENT DOCUMENTS

| | | | |
|---|---|---|---|
| 2008/0232516 A1* | 9/2008 | Cheng et al. | 375/344 |
| 2008/0261639 A1* | 10/2008 | Sun et al. | 455/515 |
| 2009/0040972 A1* | 2/2009 | Robson et al. | 370/329 |
| 2009/0110087 A1* | 4/2009 | Liu et al. | 375/260 |
| 2009/0111385 A1* | 4/2009 | Choi et al. | 455/67.13 |
| 2009/0149208 A1* | 6/2009 | Huttunen et al. | 455/509 |

OTHER PUBLICATIONS

PCT Written Opinion of the International Application No. PCT/US2009/067172 dated Feb. 4, 2010, 3 pages.

* cited by examiner

METHOD FOR INTERFERENCE-MINIMIZING RESOURCE BLOCK-SIZE SELECTION AT A MACROCELL, A MICROCELL AND A FEMTOCELL

CROSS REFERENCE TO RELATED APPLICATIONS

The present application is related to and claims priority of U.S. provisional patent applications ("Copending Provisional Applications"): (a) Ser. No. 61/151,121, entitled "Method for Interference-Minimizing Resource Block-size Selection at a Macrocell, a Microcell and a Femtocell," filed on Feb. 9, 2009; and (b) Ser. No. 61/093,206, entitled "Method for Jointly Utilizing Spectrum Sensing and Scheduling Information for FemtoCell," filed on Aug. 29, 2008. The disclosures of the Copending Provisional patent applications are hereby incorporated by reference in their entireties. The present application is also a continuation-in-part patent application of U.S. patent application ("Copending Non-Provisional Application"), entitled "OFDMA-Based Co-channel Femtocell," Ser. No. 12/333,138, filed on Dec. 11, 2008. The disclosure of the Copending Non-Provisional patent application is also hereby incorporated by reference in its entirety.

BACKGROUND OF THE INVENTION

1. Field of the Invention

The present invention relates to wireless communications. More specifically, the present invention relates to a system which enables a secondary network that uses OFDMA-based femtocell communication to coexist with a macro cellular network using the same spectrum.

2. Discussion of the Related Art

Mobile telephones are essential components that enable today's ubiquitous communication capability. Mobile telephones, which operate inside the coverage areas of service providers or operators, are becoming alternatives to fixed or "land-line" telephones. Recent trends of mobile phone usage are discussed, for example, in the article, entitled "UMA and Femtocells: Making FMC Happen" ("Choudhury"), by Partho Choudhury and Deepak Dahuja, published on-line as a *White Paper*, December 2007, obtainable at http://www.parthochoudhury.com/UMAFemto.doc Choudhury discloses that (a) approximately 30-35% of all voice calls are made over a mobile network are initiated by the subscribers at their homes, and (b) in 2006, about 35% of video streaming and broadcasting services over cellular wireless networks are received while the mobile users are at their homes.

The mobile telephones are becoming an individual's only telephone. Furthermore, mobile users that are under the age of 24 make up to 80% of their long distance calls on wireless networks, rather than wired networks. This statistic is reported in "Femto Cells: Personal Base Stations" ("Airvana"), Airvana Inc., *White Paper*, 2007, published online, http://www.airvana.com/files/Femto_Overview_Whitepaper_FINAL_12-July-07.pdf. However, the reliability, voice quality and cost of today's mobile telephone networks in indoor environments are not at a desirable level. Typically, indoor mobile telephone service is costly, with many dead spots and poor coverage, resulting in poor customer experience, so that the mobile telephone cannot truly be the only telephone the subscribers need.

Recently, a new class of base stations designed for indoor and personal use is described in both Choudhury and Airvana above, and in "The Case for Home Base Stations" ("PicoChip") PicoChip Designs Ltd., *White Paper*, April 2007, published online at http://www.picochip.com/downloads/27c85c984cd0d348edcffe7413f6ff79/femtocell_wp.pdf.

The cells using these indoor, personal base stations are referred to as "femtocells", and they enable indoor connectivity through existing broadband Internet connections. Femtocells are also considered as one of the options for fixed-mobile convergence (FMC), where the subscribers can switch an active data call session between fixed wireless network (e.g., a wireless local area network (WLAN)) and mobile network (e.g., a cellular network) (See, e.g., Choudhury, discussed above). As discussed in Choudhury, Airvana and PicoChip above, the benefits of femtocells include (a) improved indoor coverage, (b) reduced capital and operational expenditures, (c) reduced bandwidth load, (d) reduced power requirement, (e) additional high-end revenue streams, (f) improved customer royalty, (g) increase in the average revenue per user, (h) compatibility with existing handsets, and no requirement of dual-mode terminals, (i) deployment in operator-owned spectrum, and (j) enhanced emergency services (since the femtocells will know their locations).

While the femtocell promises many benefits, the technology is still at its infancy, with many technical issues still to be solved. One problem impeding femtocells from practical deployment is radio interference management (i.e., interferences between a macro-cellular network ("macrocell") and the femtocell, and between femtocells), which must be minimized. Moreover, there are still many open issues related to how to handle hand-offs between a macrocell and a femtocell, security aspects, scalability problems and access control. See, e.g., the discussions in Airvana.

The literature that addresses these personal base station problems is limited, and is typically only applicable to code division multiple access (CDMA) based technologies. However, next-generation wireless systems (e.g., Long Term Evolution (LTE) and IMT-Advanced systems) are likely to use a frequency division multiple access technology, such as orthogonal frequency division multiple-access (OFDMA) and single-carrier frequency division multiple access (SC-FDMA). Hence, the femtocells in future wireless networks are likely to use OFDMA or SC-FDMA technology, which has a different set of problems, as compared to CDMA networks. In particular, interference management and coexistence between the OFDMA-based (or SC-FDMA-based) macrocell network and the femtocell network are challenging issues that require careful design.

Further, a generic model and framework for a femtocell coexisting with a macrocell network is not available in the literature. The uplink (UL) capacity of a femtocell network that coexists with a macrocell network (i.e., a shared-spectrum network) is derived and analyzed in the article "Uplink Capacity and Interference Avoidance for Two-Tier Cellular Networks" ("Chandrasekhar"), by Vikram Chandrasekhar and Jeffrey G. Andrews, *in Proc. IEEE Global Telecommunications Conference (GLOBECOM)*, pp. 3322-3326, November 2007. In a split spectrum network, the femtocell users and the macrocell users are assigned sub-channels that are orthogonal to each other. While such a division avoids interference between the macrocell and the different femtocells, the total number of users that can be supported is diminished, especially when a large number of femtocells are provided within a macrocell. For a shared spectrum network, a femtocell may utilize some sub-channels that are also utilized by the macrocell, so long as there is limited interference between the two networks. To improve the outage probability, Chandrasekhar proposes using interference avoidance methods. In particular, the macrocell and each femtocell may use time-hopping to decrease the interference. Further, a sectored antenna may be used to provide reception for both the macrocell and femtocell, so as to achieve better capacity. Through interference avoidance (time-hopped CDMA and sectorized antennas), analytical and simulation results show that a femtocell base station (BS) density which is up to seven times higher than without interference avoidance (e.g., relative to a split spectrum network with omnidirectional femtocell antennas) can be supported.

The article, entitled "Effects of User-Deployed, Co-Channel Femtocells on the Call Drop Probability in a Residential Scenario" ("Ho"), by Lester T. W. Ho and Holger Claussen, published *in Proc. of IEEE Int. Symp. on Personal, Indoor and Mobile Radio Communications (PIMRC)*, pp. 1-5, September 2007, analyses femtocells and handover probabilities for different power configurations at a femtocell. Since manual cell planning used in macrocell networks is not practicable for femtocells (i.e., not economical), femtocells typically require auto-configuration capabilities, such as femtocell power and cell size auto-configuration. Using simulations, Ho shows that call-drop probabilities in a residential co-channel femtocell deployment can be significantly decreased through simple pilot power adaptation mechanisms.

The article "Performance of Macro- and Co-Channel Femtocells in a Hierarchical Cell Structure" ("Claussen"), by Holger Claussen, published *in Proc. of IEEE Int. Symp. on Personal, Indoor and Mobile Radio Communications (PIMRC)*, pp. 1-5, September 2007, discloses a simple power control algorithm for pilots and data in a femtocell. Simulation results show that the interference with the macrocell network can be minimized using such a power control algorithm.

Detection of subcarriers that are already being used is a critical component in an OFDMA-based femtocell. By sensing the subcarriers that are being used by the macrocell network, a femtocell can avoid using these subcarriers. Note that these detected subcarriers may be used by users who are sufficiently far away from the femtocell to allow usage by the femtocell. A challenge in detecting such subcarriers is the lack of time or frequency synchronization between the signals arriving from different macrocell mobile stations (mMSs) at the femtocell BS (fBS). Therefore, the fBS must detect the used subcarriers by spectrum sensing, without time or frequency synchronization. Spectrum sensing is discussed in the following references:

(a). Sheng-Yuan Tu, Kwang-Cheng Chen, and Rainjee Prasad, "Spectrum Sensing of OFDMA Systems for Cognitive Radios" ("Tu"), in Proc. IEEE Int. Symp. On Personal, Indoor, and Mobile Radio Communications (PIMRC), 2007.

(b). Nilesh Khambekar, Liang Dong, and VipinChaudhary, "Utilizing OFDM Guard Interval for Spectrum Sensing" ("Khambekar"), in Proc. IEEE Int. Symp. On Personal, Indoor, and Mobile Radio Communications (PIMRC), 2007.

(c) Ghurumuruhan Ganesan and Ye (Geoffrey) Li, "Cooperative Spectrum Sensing in Cognitive Radio, Part I: Two User Networks" ("Ganesan I"), IEEE Trans. Wireless Communications, vol. 6, no. 6, pp. 2204-2213, June 2007.

(d) Ghurumuruhan Ganesan and Ye (Geoffrey) Li, "Cooperative Spectrum Sensing in Cognitive Radio, Part II: Multiuser Networks" ("Ganesan II"), IEEE Trans. Wireless Communications, vol. 6, no. 6, pp. 2214-2222, June 2007.

(e) F. S. Chu and K. C. Chen, "Radio Resource Allocation in OFDMA Cognitive Radio Systems" ("Chu"), in Proc. IEEE Personal, Indoor and Mobile Radio Commun. (PIMRC), pp. 1-5, September 2007.

(f) T. H. Kim and T. J. Lee, "Spectrum Allocation Algorithms for Uplink Sub-carriers in OFDMA-Based Cognitive Radio Networks" ("Kim"), in Proc. IEEE Int. Conf. on Innovations in Information Technol., pp 51-54, November 2007.

In Tu, the Lloyd-Max algorithm is used for channel identification in a cognitive radio system, and a two-dimensional resource allocation algorithm is disclosed. Khambekar discloses spectrum allocation algorithms for uplink subcarriers in OFDMA-based cognitive radios. In Khambekar, subcarriers that are detected unused by the primary network are assigned to a secondary network based on carrier to interference plus noise ratio (CINR) and throughput considerations. For subcarriers that are used by the primary network, the ones that yield the lowest interference to the primary network, or the ones that have the largest CINR are assigned to the secondary MS. Tu and Khambekar, however, do not address issues that are uniquely related to OFDMA systems and femtocells, such as considerations of time or frequency asynchronization, or utilization of scheduling information from the macrocell BS.

The cognitive radio algorithms which are applicable to femtocells do not take advantage of any collaboration between the primary system (i.e., the macrocells) and the secondary system (i.e., the femtocells), such as providing the frequency allocation maps from the primary system. Instead, the femtocells are required to avoid all the frequency bands that appear "occupied" regardless of the level of risk of posed to the primary users at their respective locations. Hence, very limited portions of the spectrum are available to secondary networks. Since such cognitive radio algorithms require perfect avoidance of co-channel interference, cancelling the co-channel interference caused by primary systems is not developed in the cognitive radio algorithm context.

Many of the prior art systems posit that femtocells would typically be implemented as CDMA networks. However, the trend of wireless networks suggests that femtocells are likely to be based on OFDMA. Further, the size of the resource allocation block used in a macrocell network may directly impact the interference to a femtocell network. However, these effects have not been investigated in the prior art.

SUMMARY

According to one embodiment of the present invention, a method for an opportunistic network (e.g., a microcell network or a femtocell network) within a coverage area of a primary network (e.g., a macrocell network) includes (a) spectrum-sensing signals from users in the primary network to identify unused spectrum resources in a spectrum shared between the opportunistic network and the primary network; and (b) based on the spectrum resources identified, assigning the identified spectrum resources to be used among the users of the opportunistic network in one or more block sizes determined from expected interference from the users of the primary network.

The method of the present invention is applicable to a primary network whether or not spectrum resources are assigned to its users using a block-wise subcarrier assignment scheme or a randomized allocation scheme. In one embodiment, the identified unused spectrum resources that are to be assigned to the users of the opportunistic network exclude un-used subcarriers adjacent to subcarriers used by the users of the primary network to avoid interference. The opportunistic network may assign the identified unused spectrum resources using a scheme that selects a block size for an adaptive modulation and coding scheme or for avoidance of waste of spectrum resources.

According to one embodiment of the present invention, the expected interference from the primary network on the opportunistic network is determined from the delays of the signals of the users of the primary networks relative the delays of one or more signals from users of the secondary network. In one embodiment, interference is expected when a cyclic prefix of a signal from a primary user arrives at a user of the secondary network later than a cyclic prefix of a signal from another user of the secondary network.

The present invention is applicable to primary and secondary networks using OFDMA.

The present invention is better understood upon consideration of the detailed description below and the accompanying drawings.

DETAILED DESCRIPTION OF THE PREFERRED EMBODIMENTS

Figure 1:
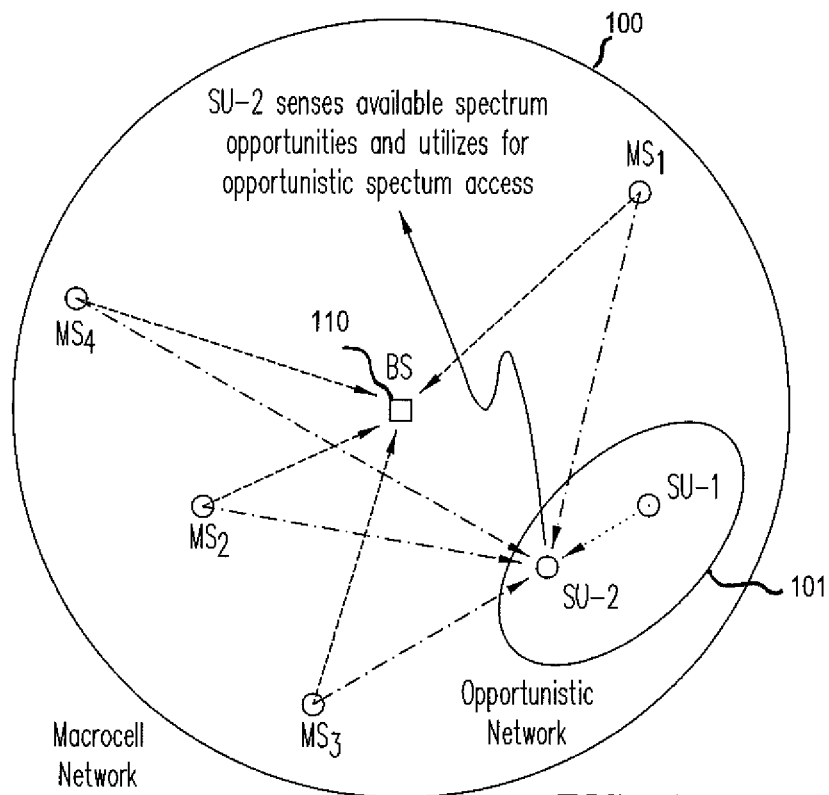
FIG. 1 shows a primary network (e.g., a macrocell network) having coverage area 100, in which users of opportunistic network 101 (e.g., a femtocell network within a microcell network) may accurately sense and take advantage of spectrum opportunities in the primary network, according to one embodiment of the present invention.

One potential problem in wireless systems is the crowding of the radio spectrum. The increasing number of different wireless technologies that may be used render the coexistence among systems in the same spectrum complex. Cognitive radio is a possible solution to the potential problem of radio spectrum crowding. At any given time, in conjunction with the OFDMA technology, a cognitive radio system can opportunistically utilize a spectrum (i.e., a range of subcarriers) that is not used by other users in the network. Such opportunistic use of unused spectrum requires either a priori knowledge of spectrum utilization, or the ability to reliably sense spectrum utilization. Failure to reliably sense spectrum utilization may lead to significant probabilities of false alarms (PFA) and misdetections (PMD). FIG. 1 shows a pnmary network (e.g., a macrocell network) having coverage area 100, in which one or more users SU-1 and SU-2 of opportunistic network 101—a secondary network—may accurately sense and take advantage of spectrum opportunities in the primary network, according to one embodiment of the present invention.

FIG. 1 shows coverage area 100 of a macrocell network with base station (BS) 110 communicating with mobile stations (MSs) $MS_1$, $MS_2$, $MS_3$ and $MS_4$ ("primary users"). At the same time, within coverage area 100 also exists opportunistic network 101 (e.g., a femtocell network or a microcell network) with secondary users SU-1 and SU-2. In FIG. 1, secondary user SU-2 may spectrum-sense to discover spectrum opportunities for use in the secondary network. As a first step in spectrum-sensing, secondary user SU-2 detects the presence of primary users by, for example, detecting the cyclic prefix (CP) or the guard band of a signal from a primary user. After detecting the primary users, secondary user SU-2 may use a threshold-based detector to detect the spectrum opportunities. When a threshold-based detector is used, an appropriate selection of the threshold is required for good detection performance. However, when some of the uplink (UL) OFDMA user signals arrive at the receiver of SU-2 with delays greater than the CP of a symbol of a received signal from another secondary user, inter-symbol interference (ISI) and inter-carrier interference (ICI) result in the secondary network. Potential for such interferences considerably decrease spectrum opportunities.

Figure 2:
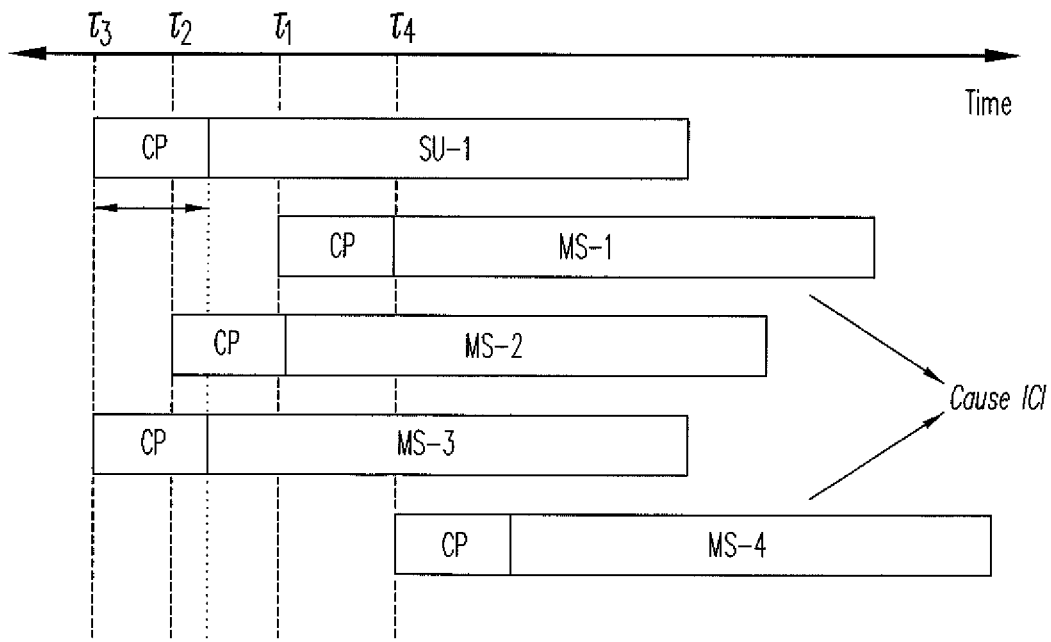
FIG. 2 shows a signal of secondary user SU-1 and uplink (UL) signals of primary users $MS_1$ and $MS_4$ arriving at the receiver of SU-2.
Figure 3D:
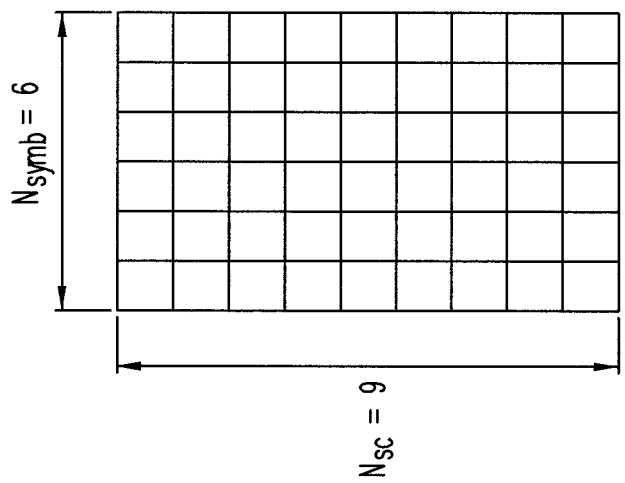
FIGS. 3(a)-3(d) show resource allocation blocks for two subcarrier assignment schemes (SASs): partial usage of subcarrier (PUSC) schemes and adjacent subcarrier permutation (ASP) schemes under LTE and WiMax standards, respectively.
Figure 3B:
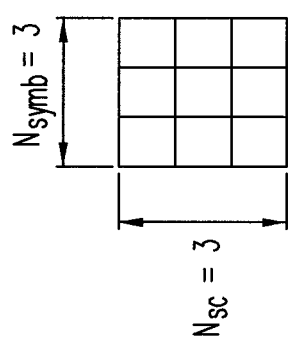
Figure 3C:
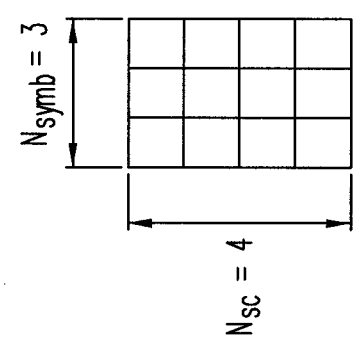
Figure 3A:
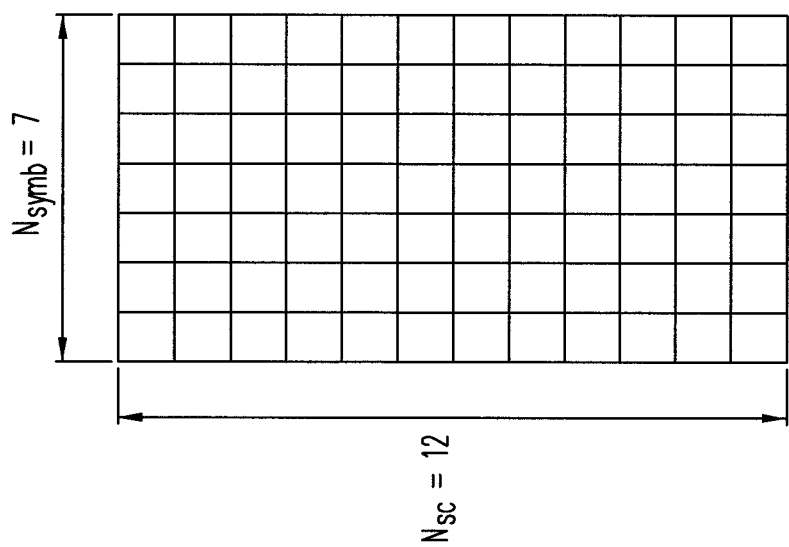

FIG. 2 illustrates the effects of interference impacting opportunistic spectrum opportunities. In the example of FIG. 2, secondary user SU-1 and SU-2 communicate with each other utilizing detected spectrum opportunities. FIG. 2 shows a signal of secondary user SU-1 and uplink (UL) signals of primary users $MS_1$ and $MS_4$ arriving at a receiver of secondary user SU-2. At the receiver of secondary user SU-2, because the UL signals of primary users $MS_1$ and $MS_4$ arrive after the CP of the signal from secondary user SU-1, ISI and ICI impact the spectrum opportunities for the secondary network. How severe this ICI affects the opportunistic network (i.e., the femtocell network or the microcell network) depends on the size of the resource allocation blocks at the macrocell.

In an OFDMA system, time-frequency resources are dynamically shared between users, exploiting channel variation in both frequency and time domains. The resource allocation, therefore, may be represented by one or more two-dimensional blocks, with each block being defined by $N_{symb}$ consecutive OFDMA symbols in the time domain and $N_{sc}$ consecutive subcarriers in the frequency domain. Under many OFDMA standards, such a two-dimensional block is referred by different names (e.g., as a resource block (RB) in LTE, and as a tile or bin in WiMAX). A resource allocation typically includes multiple blocks, which are either distributed or localized in the frequency domain, so that frequency diversity or channel-dependent scheduling can be alternatively and appropriately exploited.

FIGS. 3(a)-3(d) show resource allocation blocks for two subcarrier assignment schemes (SAS's): partial usage of subcarrier (PUSC) schemes and adjacent subcarrier permutation (ASP) schemes under LTE and WiMax standards, respectively. As mentioned above, the resource allocation blocks are characterized by the uplink parameters $N_{symb}$ and $N_{sc}$. The SASs in FIG. 3 are block-wise assignments of different block sizes. Apart from the carrier assignment schemes used under different standards (e.g., the SAS's shown in FIG. 3), the present invention is also applicable to a randomized subcarrier assignment scheme, under which each individual subcarrier may be assigned to a different user (i.e., a block size of 1).

Figure 4:
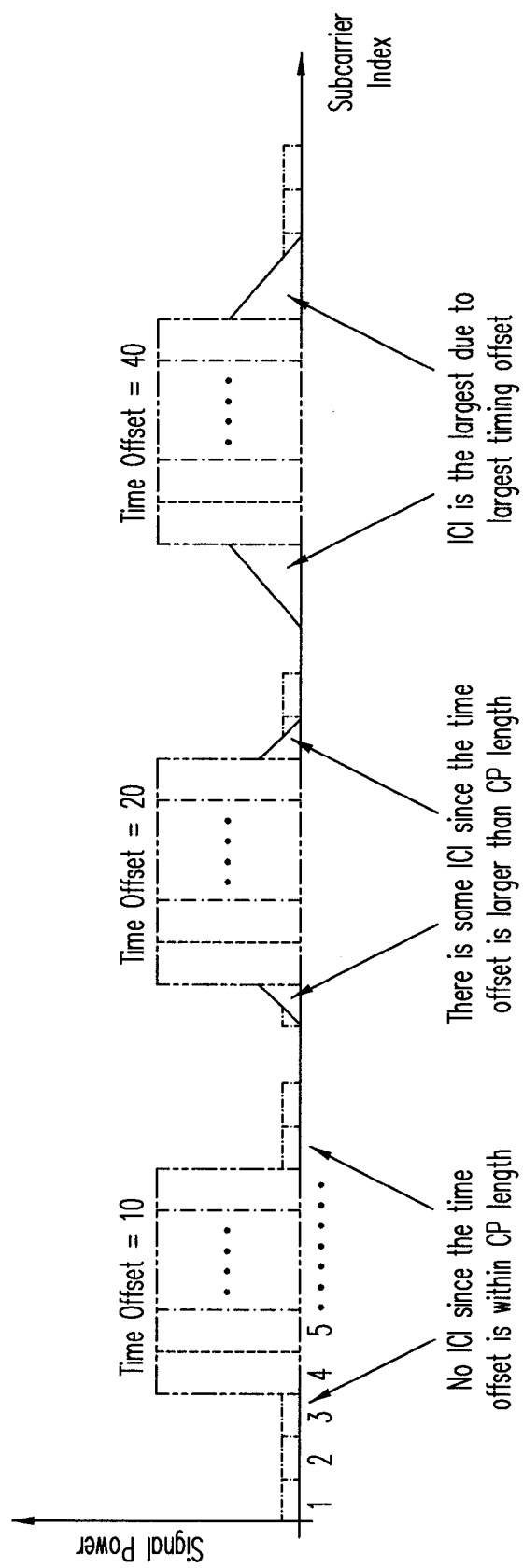
FIG. 4 illustrates the effects of block size of resource allocation in blockwise allocation schemes (e.g., the schemes in FIG. 3).
Figure 5:
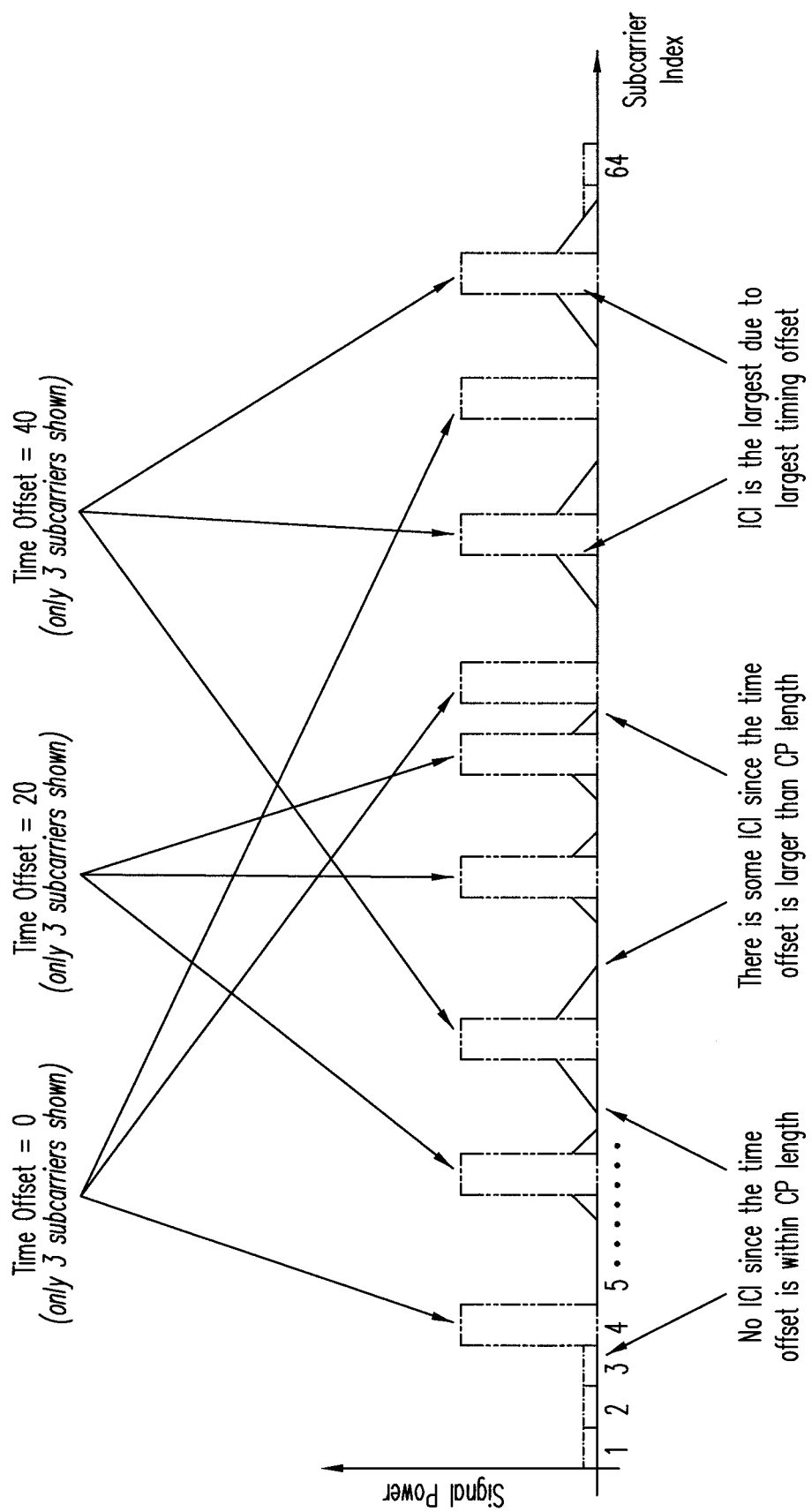
FIG. 5 illustrates the effects of block size of resource allocation in a randomized allocation scheme.

As mentioned above, the impact of ICI from the macrocell network on the opportunistic network depends on the resource allocation block size in the macrocell network. FIGS. 4 and 5 illustrate respectively the effects of block size of resource allocation in blockwise allocation schemes (e.g., the schemes in FIG. 3) and in a randomized allocation scheme. In these examples, the relevant spectrum is the spectrum observed at the BS of the femtocell network. At the macrocell BS, the signals are already synchronized, so that no ICI impact is seen in the macrocell regardless of whether an adaptive modulation and coding (AMC) scheme or an interleaved SAS is used in the macrocell network.

Consider the case in which (a) a secondary user uses a fast fourier transform (FFT) size of 64 for demodulation, with a CP of 16 samples, and (b) uplink signals from three users of the primary network are received, having delays of 10, 20, and 40 samples, respectively. In this example, the first primary user signal is within the CP of a received signal of a secondary user (hence yielding no ICI), while the signals from the other primary users arrive after the CP (thus yielding ICI). In this example, when each primary user uses 16 subcarriers, 64-(3*16)=16 subcarriers may ideally be available for use in the opportunistic network. As shown in FIG. 4, under a blockwise allocation scheme, the subcarriers adjacent to the edge subcarriers of each primary user's resource allocation block are subject to ICI. Hence, a fraction of the ideally available un-used subcarriers at a secondary network are subject to ICI (e.g., FIG. 4 shows about six (6) un-used subcarriers are subject to ICI). On the other hand, under the randomized allocation of FIG. 5, the subcarriers of the primary users may be scattered over the entire available spectrum. Thus, the subcarriers adjacent to each individual subcarrier may be subject to ICI (i.e., ICI is present in a considerably larger number of un-used subcarriers than the blockwise allocation schemes of FIG. 4). Hence, there is a significant interference penalty to an opportunistic network when a randomized allocation scheme, rather than a block-wise allocation scheme, is used at the primary network.

A similar analysis verifies that using as large a resource block in the primary network as possible yields the least interference to a secondary network. For example, rather than using 16 subcarriers per block per user, using 8 subcarriers per block per user (i.e., a larger number of resource blocks are utilized by the macrocell) results in worse interference to the femtocell. Therefore, to summarize, a randomized allocation scheme provides the least opportunities to an opportunistic network, while using as large a block size as possible provides better opportunities for the opportunistic network, because of the lesser number of un-used subcarriers are subject to ICI.

Resource allocation block size at a femtocell implicates two competing considerations. First, in a femtocell network, user mobility is typically low (e.g., may be even static). An AMC scheme, such as shown in FIG. 3 may therefore be possible. Second, the un-used subcarriers of the macrocell network may be scattered throughout the spectrum, so that using a smaller block size (or a randomized allocation scheme) results in more efficient utilization of the available spectrum opportunities in the secondary network (i.e., without or minimal waste of resources). From prior spectrum-sensing results, a secondary network may adaptively choose using a smaller or a larger resource allocation block, according to its evaluation of these competing considerations. When the ICI from the primary network is not severe, and when larger spectrum resource chunks may be utilized by the secondary network, (considering the very low mobility of femtocell MSs), the secondary network may utilize a larger resource allocation block, so as to allow AMC. On the other hand, when the spectrum opportunities are scattered throughout the spectrum, the secondary network may choose to use a smaller resource allocation to avoid wasting spectral resources. Because the transmission power is typically considerably weaker in a secondary network relative to a primary network, ICI effects from a secondary network on a primary network is negeligible.

The detailed description above is provided to illustrate specific embodiments of the present invention and is not intended to be limiting. Numerous variations and modifications within the scope of the present invention are possible. The present invention is set forth in the following claims.

I claim:

1. A method for reducing uplink inter-carrier interference (ICI) in an OFDMA system between macrocell mobile stations in a primary network having randomized allocation and a femtocell base station within a femtocell network, comprising:
   increasing a resource block size for the randomly allocated macrocell mobile stations;
   transmitting uplink messages from the macrocell mobile stations to a macrocell base station according to the increased resource block size;
   identifying unused spectrum resources outside of the increased resource blocks for the macrocell mobile stations; and
   assigning the identified unused spectrum resources to be used among the users of the femtocell network, wherein the increased resource block size for the macrocell mobile stations reduces the inter-carrier interference at the femtocell base station.

2. The method as in claim 1, wherein the identified unused spectrum resources that are to be assigned to the users of the femtocell exclude un-used subcarriers adjacent to subcarriers used by the users of the primary network.

3. The method as in claim 2, wherein the femtocell network assigns the identified unused spectrum resources using a scheme that selects a femtocell block size for an adaptive modulation and coding scheme.

4. The method as in claim 2, wherein the femtocell network assigns the identified unused spectrum resources using a scheme that selects a block size to avoid waste of spectrum resources.

5. The method as in claim 1, wherein the reduced interference is a reduced intercarrier interference (ICI).

6. The method as in claim 1, wherein both the macrocell and the femtocell primary network and the opportunistic network use orthogonal frequency division multiple access technology.

7. A method for an opportunistic network within a coverage area of a primary network, comprising:
   spectrum-sensing signals from users in the primary network to identify unused spectrum resources in a spectrum shared between the opportunistic network and the primary network; and
   based on the spectrum resources identified, assigning the identified spectrum resources to be used among the users of the opportunistic network having randomized allocation in a largest-possible resource block size determined from expected interference from the users of the primary network, wherein the expected interference is determined from delays of the signals of the users of the primary network relative to delays of one or more signals from users of the opportunistic network, and wherein interference is expected when a cyclic prefix of a signal from a primary user arrives at a user of the secondary network later than a cyclic prefix of a signal from another user of the secondary network.

* * * * *